US012141792B2

(12) United States Patent
Sethi

(10) Patent No.: US 12,141,792 B2
(45) Date of Patent: Nov. 12, 2024

(54) SYSTEM AND METHOD FOR A CROSS-PLATFORM KEY ACROSS DIGITAL WALLET PROVIDERS

(71) Applicant: Visa International Service Association, San Francisco, CA (US)

(72) Inventor: Vikash Kumar Sethi, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/467,018

(22) Filed: Sep. 14, 2023

(65) Prior Publication Data

US 2024/0005308 A1  Jan. 4, 2024

Related U.S. Application Data

(62) Division of application No. 16/407,117, filed on May 8, 2019, now Pat. No. 11,797,980.

(51) Int. Cl.
*G06Q 20/38* (2012.01)
*G06Q 20/36* (2012.01)
*G06Q 20/40* (2012.01)

(52) U.S. Cl.
CPC ..... *G06Q 20/3674* (2013.01); *G06Q 20/3829* (2013.01); *G06Q 20/409* (2013.01)

(58) Field of Classification Search
CPC ........... G06Q 20/3674; G06Q 20/3829; G06Q 20/409
USPC .......................................................... 705/67
See application file for complete search history.

(56) References Cited

U.S. PATENT DOCUMENTS

| 10,997,592 | B1* | 5/2021 | Kurani | G06Q 20/3821 |
| 2012/0011063 | A1* | 1/2012 | Killian | G06Q 20/349 |
| | | | | 705/41 |
| 2014/0012749 | A1* | 1/2014 | Lee | G06Q 20/367 |
| | | | | 705/40 |
| 2015/0019443 | A1* | 1/2015 | Sheets | G06Q 20/322 |
| | | | | 705/71 |
| 2015/0302397 | A1* | 10/2015 | Kalgi | G06Q 20/3829 |
| | | | | 705/65 |

(Continued)

FOREIGN PATENT DOCUMENTS

WO  2015134604 A1  9/2015

OTHER PUBLICATIONS

Adams The Pros and Cons of Using Digital Wallets for Transactions, retrieved from https://www.businesstechweekly.com/finance-and-accounting/online-payments/digital-wallets-for-transactions/, Apr. 23, 2023, 10 pages (Year: 2023).*

(Continued)

*Primary Examiner* — James D Nigh
(74) *Attorney, Agent, or Firm* — K&L Gates LLP

(57) ABSTRACT

A cross-wallet system generate a cross-platform key or a virtual account number for a first digital wallet provider to be used by the consumer when the consumer wishes to send payment to a second digital wallet provider with which the consumer does not possess an account. Moreover, the virtual account number, in one example, may only include a partial set of card number that does not include the typical set of card number. The virtual account number created by embodiments of the invention further enable security features that prevent fraud and protect the consumer's financial assets.

20 Claims, 12 Drawing Sheets

(56) References Cited

U.S. PATENT DOCUMENTS

| | | | | |
|---|---|---|---|---|
| 2016/0019545 | A1* | 1/2016 | Vastenavondt | G06Q 20/227 705/44 |
| 2016/0148197 | A1* | 5/2016 | Dimmick | G06Q 20/36 705/67 |
| 2016/0217459 | A1* | 7/2016 | Lindner | G06Q 20/367 |
| 2017/0068952 | A1* | 3/2017 | Brockmann | G06Q 20/4014 |
| 2017/0091721 | A1* | 3/2017 | Ronca | G06Q 20/065 |
| 2017/0293914 | A1* | 10/2017 | Girish | G06Q 20/405 |
| 2018/0268399 | A1* | 9/2018 | Spector | G06Q 20/202 |
| 2018/0276656 | A1* | 9/2018 | Goyal | G06Q 20/351 |
| 2019/0005491 | A1* | 1/2019 | Grassadonia | G06Q 20/4014 |
| 2019/0095906 | A1* | 3/2019 | Shrivastava | G06Q 30/0226 |
| 2019/0362339 | A1* | 11/2019 | Gurunathan | G06Q 20/3674 |
| 2019/0385160 | A1* | 12/2019 | Safak | G06Q 20/3829 |

OTHER PUBLICATIONS

Yasar et al. "What is a digital wallet?", TechTarget, 2023, 5 pages (Year: 2023).*

Yasar et al., What is a digital wallet?, TechTarget (2023), 5 pages.

Adams, the Pros and Cons of Using Digital Wallets for Transactions; retrieved from https://www.businesstechweekly.com/finance-and-accounting/online-payments/digital-wallets-for-transactions/, Apr. 23, 2023, 10 pages.

* cited by examiner

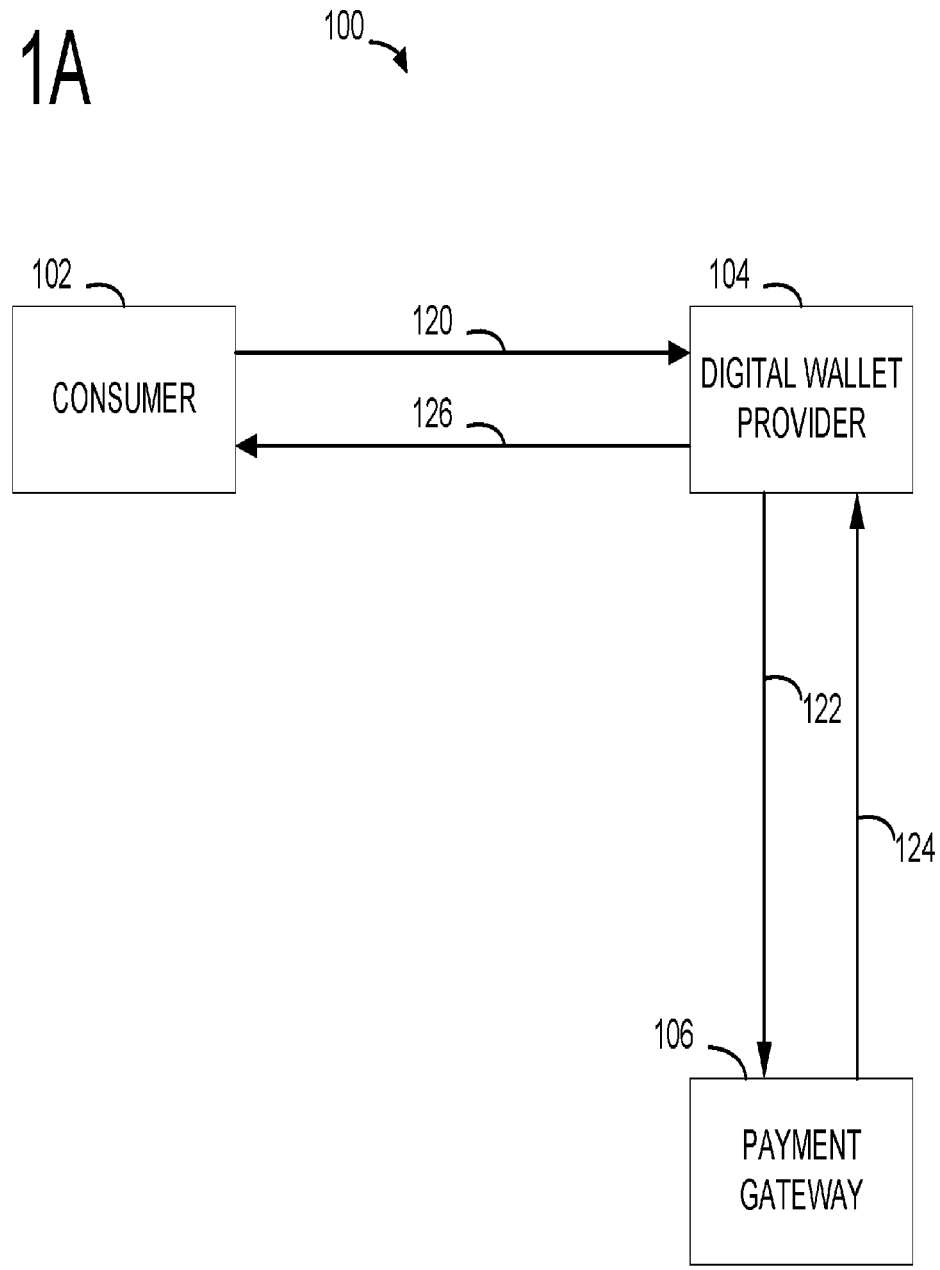

PAYMENT ACCOUNT # 1
XXXX-3021
EXP. 04/23                    >>
                              232

PLEASE ENTER INFORMATION OF DESTINATION DIGITAL WALLET PROVIDER:

NAME:                    🔍 ⌄
                              242

PLEASE ENTER MERCHANT NAME AND/OR MERCHANT ID WITH THE DESTINATION DIGITAL WALLET PROVIDER:

NAME:                    🔍 ⌄
                              244

PLEASE ENTER THE AMOUNT:

USD ⌄ : _____    246

| CANCEL | NEXT |
| 248 | 250 |

PAYMENT ACCOUNT # 1
XXXX-3021
EXP. 04/23                    >>
                    232

DESTINATION DIGITAL WALLET PROVIDER:

XYZ PAY

MERCHANT:

ID# 9839203402045
   ABC SHOP

AMOUNT:                       254

52.49 USD

VIRTUAL CARD NUMBER
                              262
4329 3924 3920 7849

| CANCEL 264 | CONFIRM AND PAY 266 | SCAN CODE 268 |

PAYMENT ACCOUNT # 1
XXXX-3021
EXP. 04/23                              >>
                      232

PLEASE ENTER INFORMATION OF SOURCE
DIGITAL WALLET PROVIDER:

NAME:                    🔍 ⌄
                                    282

USERNAME:

PASSWORD

PLEASE ENTER INFORMATION OF DESTINATION
DIGITAL WALLET PROVIDER:

NAME:                    🔍 ⌄
                                    242

PLEASE ENTER MERCHANT NAME AND/OR
MERCHANT ID WITH THE DESTINATION DIGITAL
WALLET PROVIDER:

NAME:                    🔍 ⌄
                                    244

PLEASE ENTER THE AMOUNT:

USD ⌄ : _____        246

| CANCEL | NEXT |
| 248 | 250 |

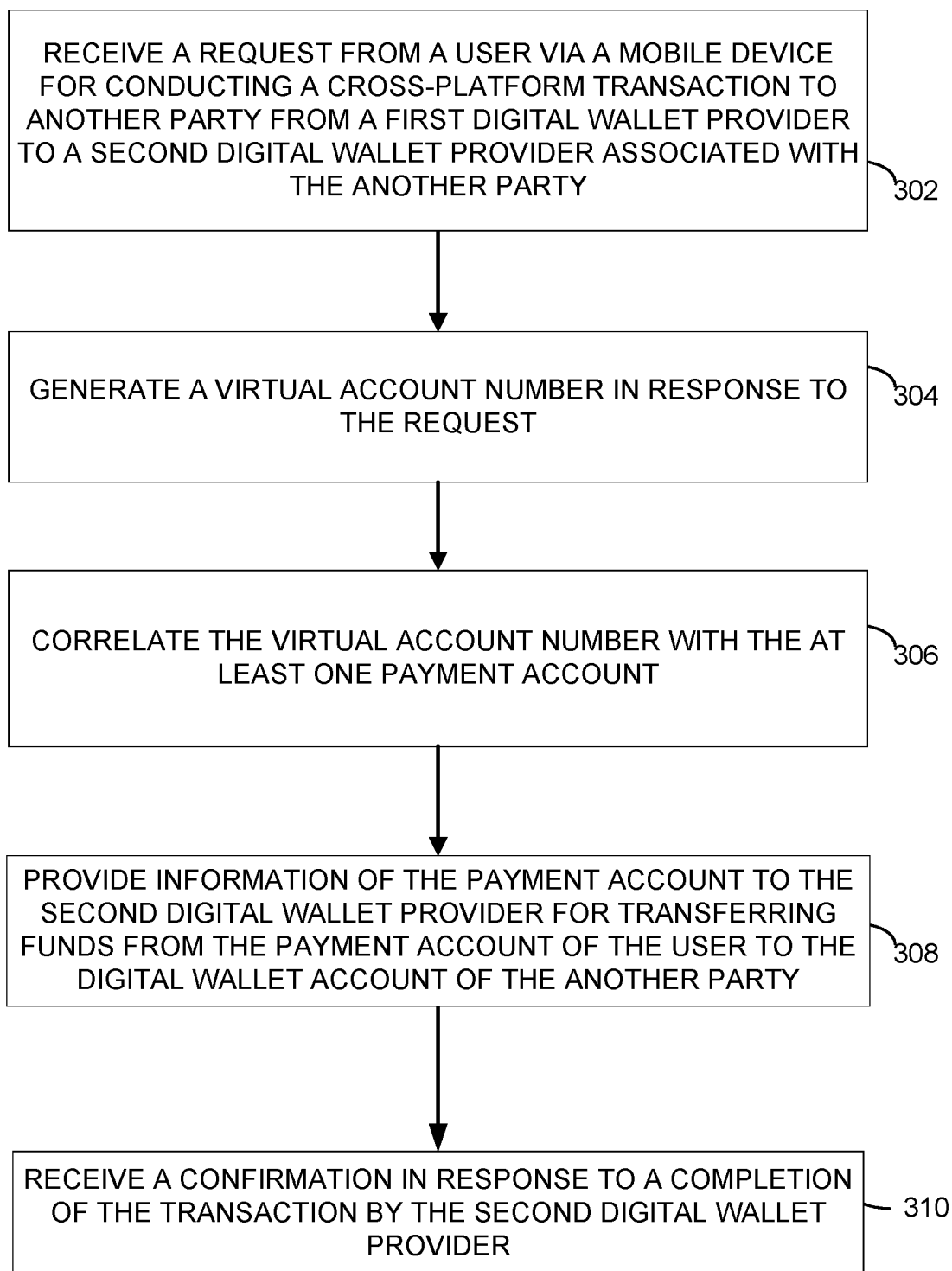

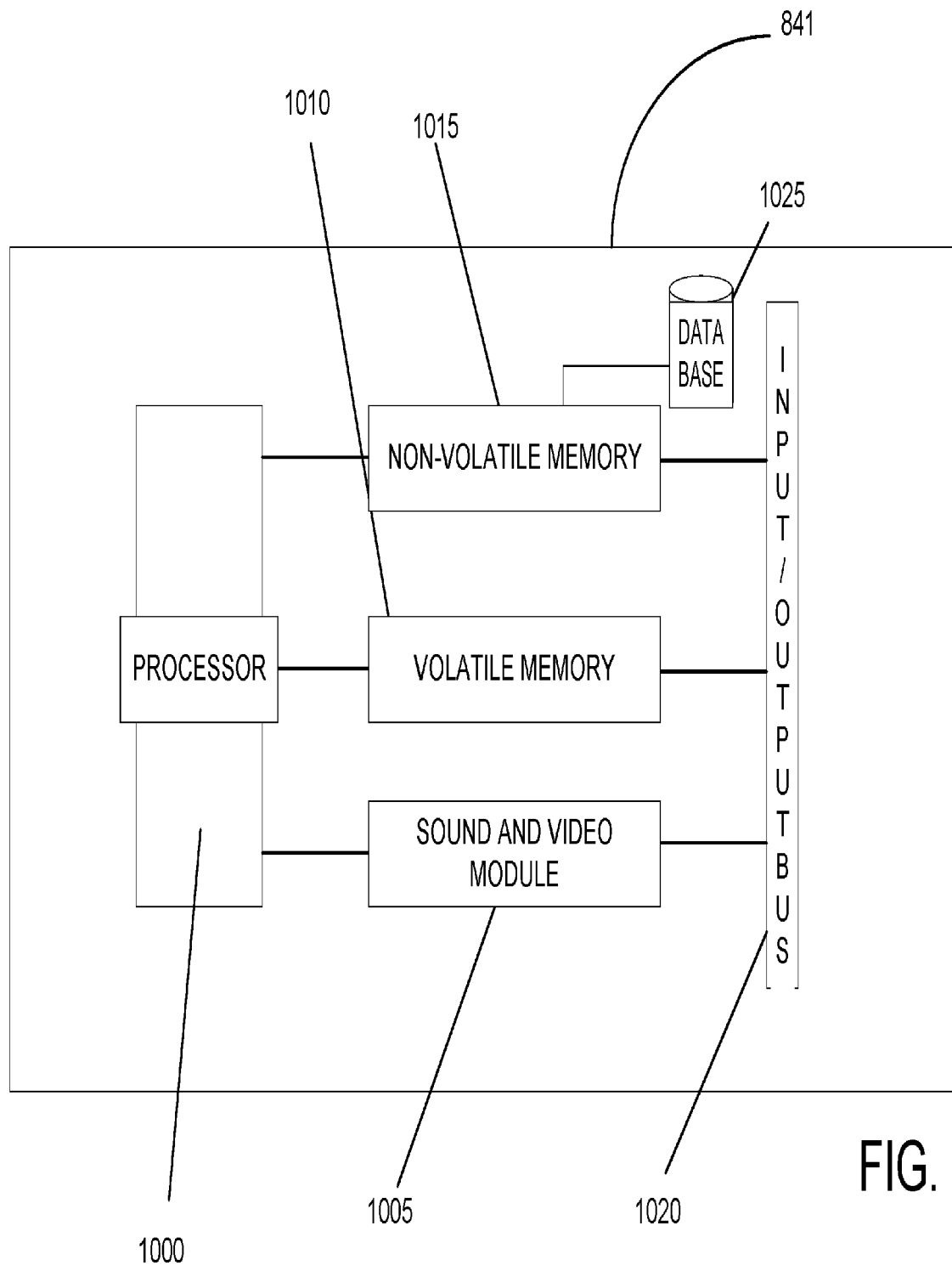

SYSTEM AND METHOD FOR A CROSS-PLATFORM KEY ACROSS DIGITAL WALLET PROVIDERS

CROSS-REFERENCE TO RELATED APPLICATION

This application is a divisional application claiming priority under 35 U.S.C. § 120 to U.S. patent application Ser. No. 16/407,117, entitled SYSTEM AND METHOD FOR A CROSS-PLATFORM KEY ACROSS DIGITAL WALLET PROVIDERS. The entire disclosure of which is hereby incorporated by reference herein.

TECHNICAL FIELD

Embodiments of the invention generally relate to enabling various digital wallet providers to accept payment accounts.

BACKGROUND

Digital wallet providers have gained tremendous popularity as a result of the synergy of: online shopping, increased ability of smartphones, and power of apps installed in smartphones. For example, Android mobile system supports digital wallets from Google®, Samsung®, Wechat® Pay, Amazon® Pay, AliPay®, PayTM, Mobikwik, PhonePe, Line Pay, Emome Pay, etc. Apple iOS system includes Apple Wallet, along with some of the above examples.

While many of these digital wallet providers are available to consumers, unfortunately, not every merchant make themselves available to all of these systems. For example, certain systems are known in certain country or part of the world only while some systems are semi-closed systems where some payment devices are incompatible or not supported.

Of course, consumers can always pay with cash, debit cards, or credit cards at merchants. However, when consumers are without these payment devices and when merchants do not support the digital wallet providers that the consumer's has in his or her smartphone, it could result in a rather embarrassing moment for the consumer. The consumer can always sign up for a new wallet system on the spot at the merchant's location; however, such option may not always be feasible because of the internet connectivity, 2-way verification, lack of possession of a credit card, etc.

Therefore, embodiments of the invention attempt to solve or address one or more problems with technical solutions.

SUMMARY

Embodiments of the invention generate a cross-platform key or a virtual account number (hereinafter "virtual account number" for simplicity purposes only) for a first digital wallet provider to be used by the consumer when the consumer wishes to send payment to a second digital wallet provider with which the consumer does not possess an account. Moreover, the virtual account number, in one example, may only include a partial set of credit card that does not include the typical set of card number. The virtual account number created by embodiments of the invention further enable security features that prevent fraud and protect the consumer's financial assets.

BRIEF DESCRIPTION OF THE DRAWINGS

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

FIG. 1A is a diagram illustrating a system for creating a virtual account number for a consumer according to one embodiment of the invention.

FIGS. 2A to 2F are graphical user interface (GUI) diagrams showing a cross wallet application according to one embodiment of the invention.

FIG. 3 is a flowchart illustrating a computer implemented method according to one embodiment of the invention.

FIG. 6 is a diagram illustrating a remote computing device according to one embodiment of the invention.

DETAILED DESCRIPTION

Figure 1B:
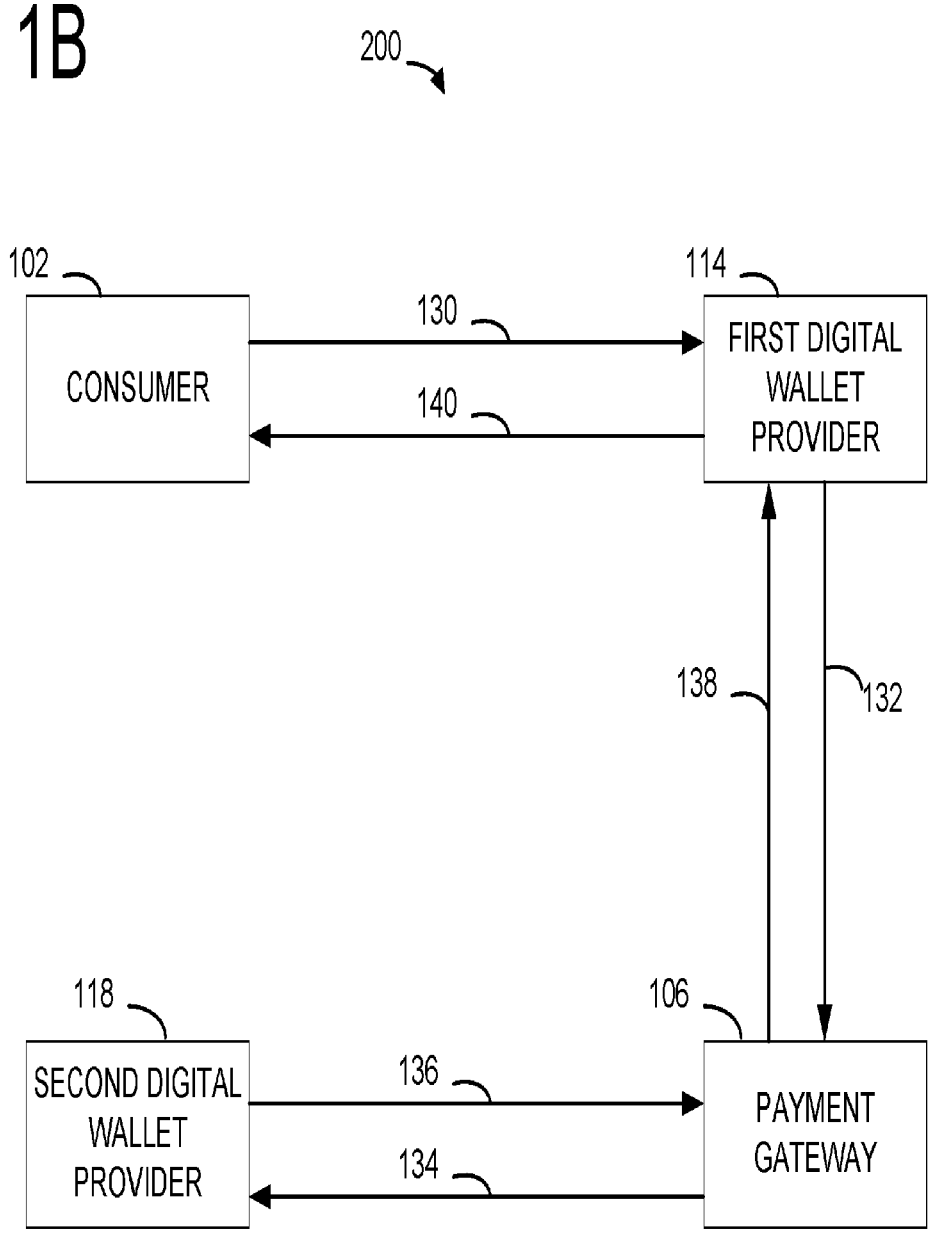
FIG. 1B is a diagram illustrating a system for enabling a consumer to make payment from a first digital wallet provider to a second digital wallet provider according to one embodiment of the invention.

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Referring now to FIG. 1A, a diagram illustrates a system 100 for creating a virtual account number for a consumer according to one embodiment of the invention. In one embodiment, a consumer 102 may initially need to enroll or establish an account with a digital wallet provider or provider 104 at 120. In one embodiment, the consumer 102 may sign up with the digital wallet provider 104 to create a user name and other credentials with the digital wallet provider 104. The consumer 102 may then download an app provided by the digital wallet provider 104 to be installed on his or her smartphone. Once installed, the consumer 102 may use the same credentials when creating the digital wallet account with the digital wallet provider 104. The consumer 102 may then add payment account numbers to the digital wallet account. In one embodiment, the consumer 102 may add or register an actual payment account number at 120 with the first digital wallet provider 114. For example, the actual account number may be a PAN, which may include the 16 or 15 digit credit number (e.g., 4388 5760 xxxx xxxx or 3788 799222 xxxxx), a 3 or 4 digit card verification value (CVV) (e.g., 423 or 4080), an expiration: mm/yy (e.g., 05/23), and a billing address associated with the account. The payment account may also include an address of the consumer 102 and/or a mobile telephone number of the consumer 102.

Once the payment account number has been entered at 120, the digital wallet provider 104 may establish an account for the consumer 102. In one embodiment, the digital wallet provider 104 may send the information to the payment exchange 106 for verification at 124. As part of the verification, the digital wallet provider 104 may transmit information or data to the payment exchange 106 so that the payment exchange 106 may populate the received information into a data structure 400, to be described below. In one embodiment, the payment exchange 106 may generate a virtual account number as part of the verification. Once the data structure 400 creation has completed, the payment exchange 106 may transmit a confirmation back to the digital wallet provider 104 at 124, and the digital wallet provider 104 may confirm with the consumer 102 at 126 that the account and the payment account number has been added to the account.

Figure 4:
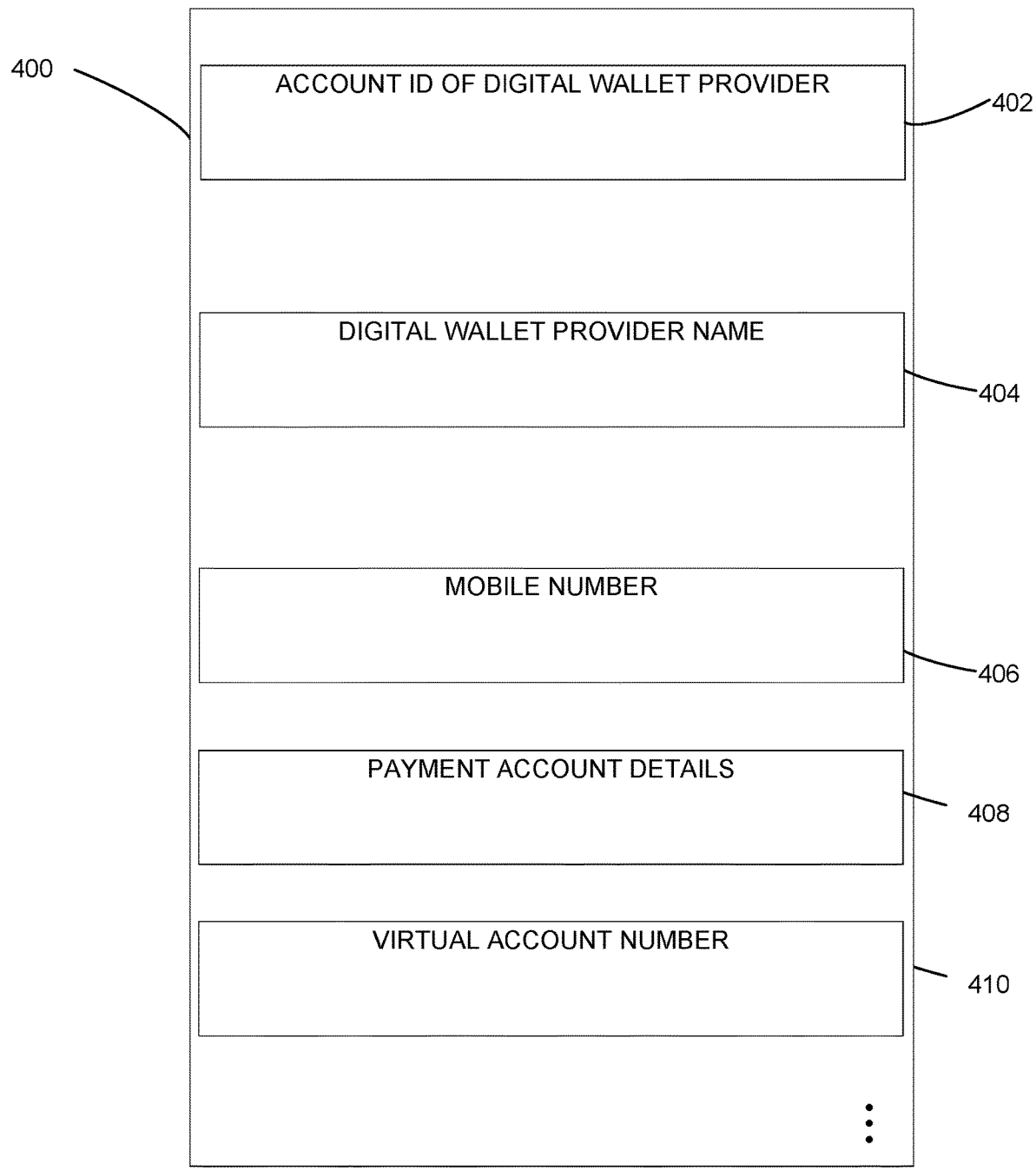
FIG. 4 is a diagram illustrating a data structure for facilitating a virtual account number according to one embodiment of the invention.

In a further embodiment, the payment gateway 106 may generate a data structure, as shown in FIG. 4, to store the payment account. For example, the data structure 400 may include a data field 402 for storing an account identification (ID) of the consumer 102 associated with the digital wallet provider 104. A data field 404 may store a name of the digital wallet provider 104. Furthermore, the data structure 400 may further include a data field 406 for storing a mobile phone number of the consumer. In another embodiment, the data field 406 may store more than one mobile number. For example, the data filed 406 may store one or more mobile numbers for the consumer 102 as the consumer 102 may have multiple numbers associated with a smartphone or verifications purposes.

The data structure 400 may further include a data field 408 for storing payment account details. For example, the data field 408 may store card number, CVV, expiration date and year, account name, and account address. In another embodiment, the data structure 400 may further include a data field 410 for storing virtual account number. For example, the virtual account number may be 16 or 15 digit number. In another embodiment, the virtual account number lacks the full feature set of numbers that are typical for a valid credit card number, such as with CVV and expiration data/year. In other words, the virtual account number, unlike existing virtual account number that resembles in format as the existing payment account details for credits, the virtual account number of embodiments is a partial set of number. As such, the consumer 102 may not really use the virtual account number as a separate form of payment. Rather, aspects of the invention enable such virtual account number as a way to enable cross digital wallet payments.

It is to be understood that other information or data may be stored with one or more data fields added to the data structure 400 without departing from the scope or spirit of embodiments of the invention.

Referring now to FIG. 1B, a diagram illustrates a system 200 for enabling a consumer to make payment from a first digital wallet provider to a second digital wallet provider according to one embodiment of the invention. In FIG. 1B, the system 200 now includes a first digital wallet provider 114 and a second digital wallet provider 118. As previously discussed, the consumer 102 sometimes may need to make a payment via the first digital wallet provider 114 to the second digital wallet provider 118.

In one embodiment, once the virtual account number is associated with the consumer's account with the first digital wallet provider 114 at the payment exchange 106, the consumer 102 may then initiate a request for a payment or transfer of funds from the first digital wallet provider 114 to the second digital wallet provider 118 at 130.

Figure 2A:
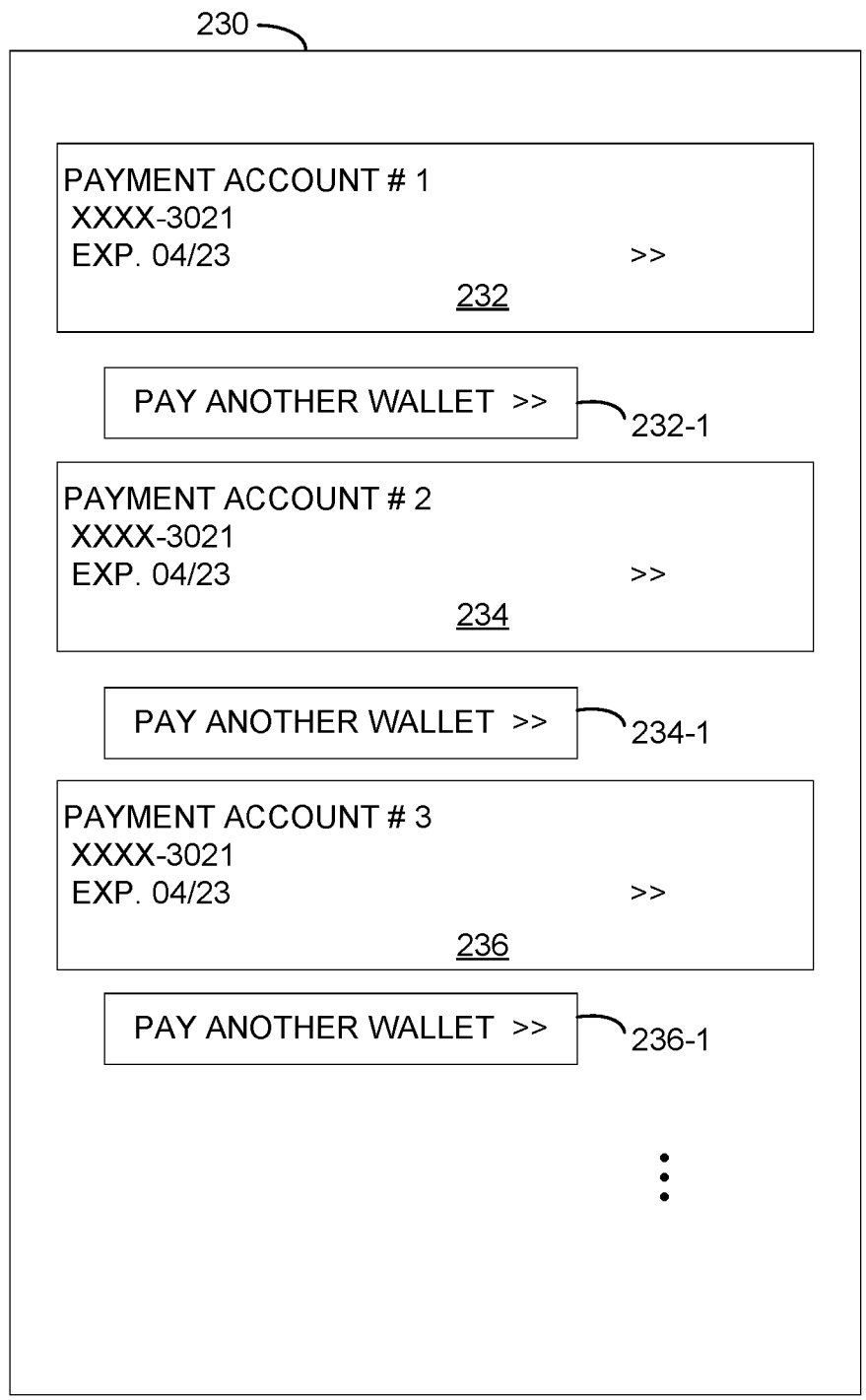
Figure 2C:
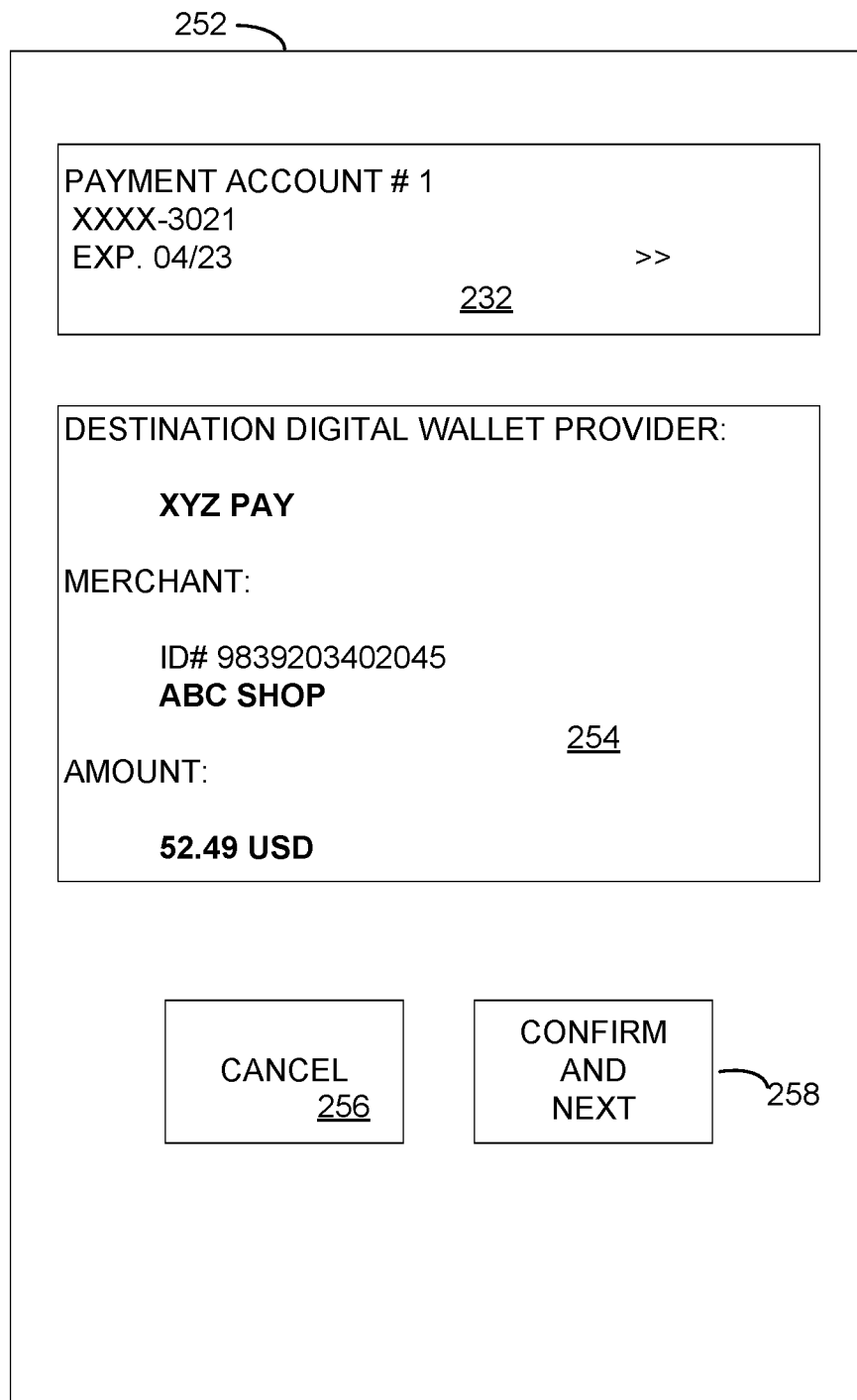
Figure 2E:
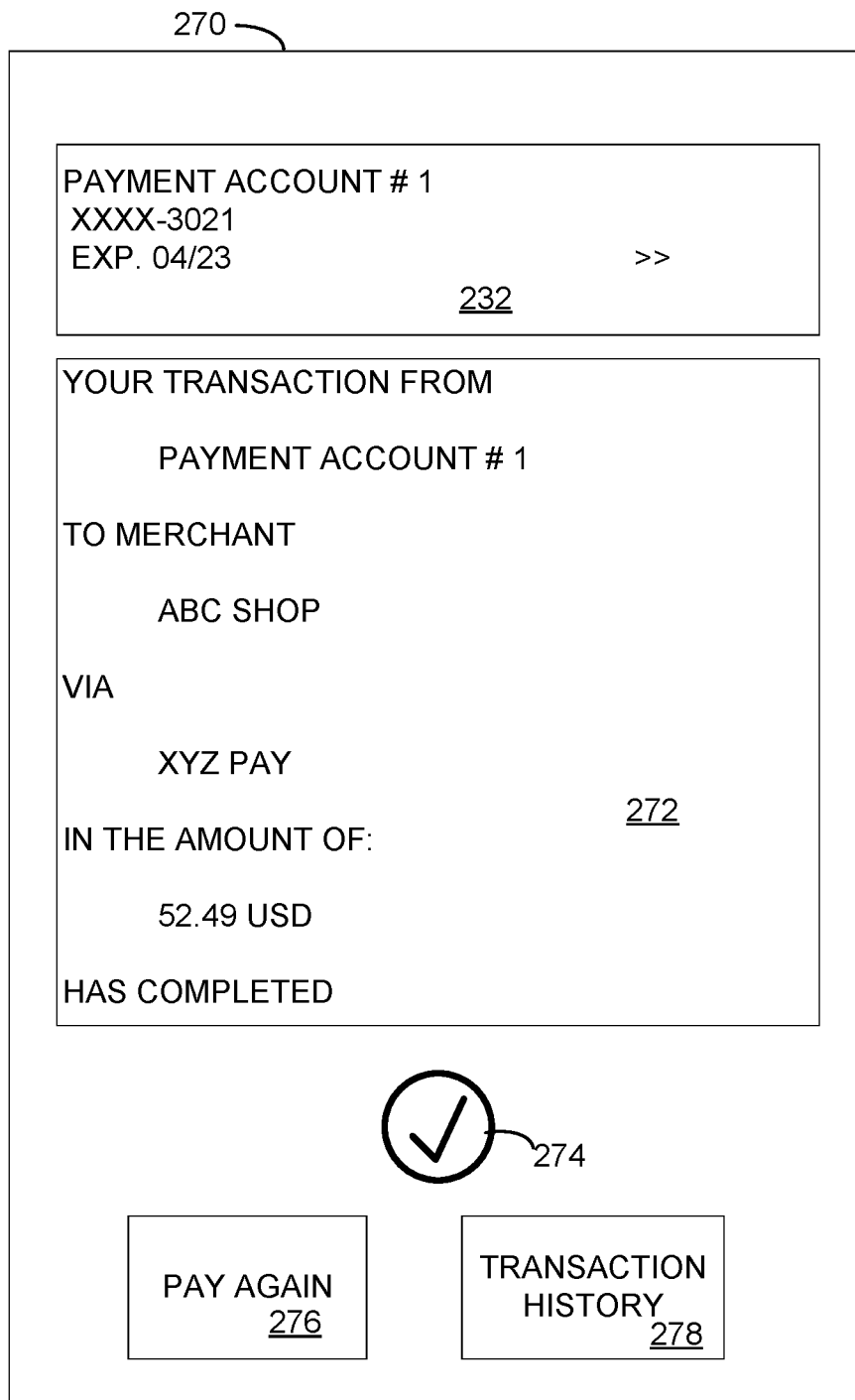

With a series of GUI screens in FIGS. 2A and 2E, aspects of the invention further illustrate the consumer's perspective. For example, FIG. 2A illustrates a snapshot of a GUI 230 showing one or more accounts that the consumer 102 may have with the first digital wallet provider 114. For example, the consumer 102 may include three payment accounts: 232, 234, 236. The GUI 230 may illustrate some details of each of the payment accounts with a double right arrow ">>" illustrating that more details may be revealed upon selection thereof. The GUI 230 further may illustrate a "PAY ANOTHER WALLET" button for each of the accounts. In one embodiment, each account has its corresponding button, such as the payment account #1 has a button 232-1. Once the consumer 102 selects the corresponding button (e.g., button 232-1, button 234-1, or button 236-1), the first digital wallet provider 114 may correlate the payment source account to that particular payment account.

Upon selection or activating of one of the buttons 232-1, 234-1, and 236-1, the consumer 102 may be presented with another GUI 240 as shown in FIG. 2B. In one embodiment, the consumer 102 may have selected button 232-1, which correlates to the payment account #1 232. As such, that account information is displayed again as a reference point to the consumer 102. The GUI 240 may further present additional fields for the consumer 102 to enter. For example, the GUI 240 may provide a field 242 for the name of the second digital wallet provider 118, a field 244 for the name of the merchant or party to receive the funds, and a field 246 for the amount of the funds. The GUI 240 may also present a next button 250 to transition to the next step or a cancel 248 to cancel the process.

At FIG. 2C, a GUI 252 may present a confirmation screen to the consumer 102 regarding the request at 130 from FIG. 1B. For example, a summary information pane 254 may be presented to the consumer 102 and the consumer 102 may have an opportunity to select a cancel button 256 or a confirm and next button 258 to transition to the next process.

At FIG. 2D, a GUI 260 may further present to the consumer 102 a virtual account number 262 to the consumer 102 so that the consumer 102 may either present the number on the smartphone to the merchant before selecting a "Confirm and Pay" button 266 or may select a "Scan Code" button 268 to transmit the virtual account number digitally and wirelessly. For example, the consumer 102 may use the camera of the smartphone to scan a bar code or quick reference (QR) code displayed by the merchant for submitting a payment. Of course, if the consumer 102 wishes to abort the process, the consumer 102 may select a cancel button 264.

In FIG. 2E, a GUI 270 may present an end point of the process by displaying a completion pane 272 showing a summary of the exchange or transfer. The consumer 102 may select a checkmark icon 274 to return to an initial screen, such as the GUI 230. On the other hand, if the consumer 102 wishes to execute another request, in another embodiment, the consumer 102 may select a "Pay again" button 276. In a further embodiment, the consumer 102 select a "Transaction History" button 278 to see the transaction history.

Once the consumer 102 completes the request at 130 in FIG. 1B, the first digital wallet provider 114 may transmit the request to the payment gateway 106 at 132. The payment gateway 106 may match the virtual account number with the actual payment account number, such as the payment account #1, to confirm the accuracy of the account information and correlate to the payment account number with the virtual account number (e.g., looking up data fields in the data structure 400). Once confirmed, the payment exchange 106 may, at 134, transmit the actual account number, the amount indicated, the recipient of the funds (e.g., the merchant or the party identified by the consumer 102 in FIG. 2B), and the second digital wallet provider 118 to initiate the transfer of funds. In one embodiment, the data packet sent from the payment exchange 106 to the second digital wallet provider 118 may be encrypted or tokenized. In another embodiment, the payment gateway 106 and the second digital wallet provider 118 may have a pre-established relationship such as pre-negotiated data syntax, etc., to facilitate the transfer to minimize errors, etc. Once the second digital wallet provider 118 verifies the recipient having an account with the second digital wallet provider 118, the second digital wallet provider 118 may send a confirmation to the payment gateway 106 at 136. The payment gateway 106 may forward the confirmation to the first digital wallet provider 114 at 138 before the consumer 102 may receive the confirmation at 140.

In the embodiment where the consumer 102 may scan a code presented by the merchant or the recipient, the smartphone of the consumer 102 may send the virtual account securely (e.g., tokenized or encrypted via the app of the first digital wallet provider 114) to the merchant. When the merchant or the recipient may send the virtual account number as a request for payment to the second digital wallet provider 118, and the second digital wallet provider 118 may verify the account with the payment gateway 106 before confirming.

In an alternative embodiment, the consumer 102 may have an account with the payment gateway 106. As such, with a similar GUIs in FIGS. 2A, 2C-2E, the consumer 102 may be presented with a GUI 280 in FIG. 2F to enter an extra set of fields relating to the account associated with first digital wallet provider 114 that the consumer 102 has. For example, in one embodiment, the consumer 102 may have registered the same payment account #1 with the first digital wallet provider 114 and the payment gateway 106. Therefore, the consumer 106 may also login to the app provided by the payment gateway 106 to request the virtual account number.

In another embodiment, as shown in FIG. 4, the virtual account number may be created corresponding to a particular payment account in prior transactions. As such, the virtual account number may be presented to the consumer in subsequent transactions using the same payment account number (e.g., payment account #1). In another embodiment, the virtual account number may be generated at random and on demand.

It is to be understood that other GUI configurations or designs may be used for FIGS. 2A and 2F without departing from the scope or spirit of embodiments of the invention. Moreover, multiple GUIs may be combined or truncated by design and such modifications are also contemplated by aspects of the invention.

Referring now to FIG. 3, a flow chart illustrates a computer-implemented method of a cross-wallet system according to one embodiment of the invention. In one embodiment, at 302, a payment gateway server (see also FIG. 6) may receive a request from a user via a mobile device (see also FIG. 5) for conducting a cross-platform transaction to another party from a first digital wallet provider to a second digital wallet provider. In one embodiment, the user may have an account associated with the first digital wallet provider and lack an affiliation with the second digital wallet provider. In another embodiment, the account may have at least one payment account associated therewith. In a further embodiment, the another party may have a digital wallet account with the second digital wallet provider and have no affiliation with the first digital wallet provider. At 304, the payment gateway server may genera virtual account number in response to the request.

At 306, the payment gateway server may correlate the cross-platform key with the at least one payment account.

At 308, the payment gateway server may provide information of the payment account to the second digital wallet provider for transferring funds from the payment account of the user to the digital wallet account of the another party.

In one embodiment, the payment gateway server may receive a confirmation in response to a completion of the transaction by the second digital wallet provider at 310.

Figure 5:
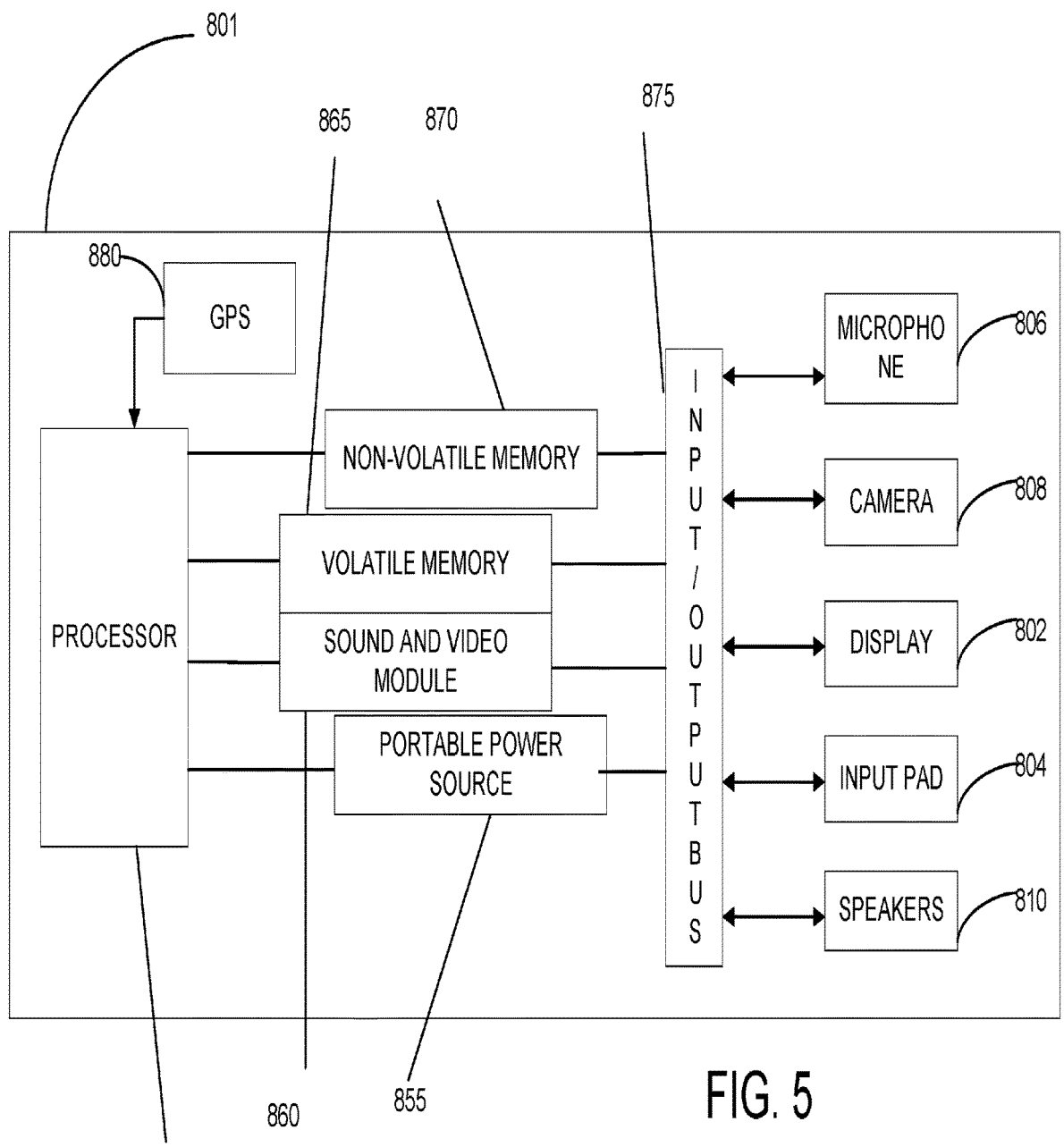
FIG. 5 is a diagram illustrating a portable computing device according to one embodiment of the invention.

FIG. 5 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 112 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 841 or may be through a communication network 102 such as cellular service, through the Internet, through a private network, through Bluetooth, etc. FIG. 5 may be a simplified illustration of the physical elements that make up a portable computing device 801 and FIG. 6 may be a simplified illustration of the physical elements that make up a server type computing device 841.

FIG. 5 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 6. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be general purpose computers that may have, among other elements, a microprocessor (such as from the Intel Corporation, AMD, ARM, Qualcomm, or MediaTek); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, iOS, Android, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving verification card information when exchanging between a payment processor and a bank who needs to comply with more stringent national and local banking regulations. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computer-implemented method comprising:
   displaying a graphical user interface (GUI) to a client device of a user, said GUI including one or more data fields for completing a request for a cross-platform key;
   receiving a first input from the user identifying at least one digital wallet provider;
   receiving a second input from the user identifying an account credential associated with the at least one digital wallet provider;
   determining whether the user already possesses a cross-platform key associated with the account credential of the digital wallet provider;
   in response to the determination being negative, generating the cross-platform key, said cross-platform key comprising a set of partial account data as compared to a normal transaction; and
   associating the cross-platform key with the at least one digital wallet provider.

2. The computerized method of claim 1, wherein the set of partial account data comprises a set of credit card numbers only.

3. The computerized method of claim 2, wherein a credit validation value (CVV) is absent from the set of partial account data.

4. The computerized method of claim 2, wherein an expiration date and year information is absent from the set of partial account data.

5. The computerized method of claim 1, further comprising:
   creating an account associated with the at least one digital wallet provider, wherein the account credential is associated to the account.

6. The computerized method of claim 5, further comprising:
   creating a username and other credentials associated with the at least one digital wallet provider.

7. The computerized method of claim 1, further comprising:
   installing an application provided by the at least one digital wallet provider onto the client device.

8. The computerized method of claim 5, further comprising:
   adding at least one payment account number to the account.

9. The method of claim 8, wherein the at least one payment account number can comprise a PAN, a card verification value, an expiration, or a billing address associated with the account.

10. A non-transitory computer readable medium storing instructions that when executed by a processor performs a method comprising:
    displaying, a graphical user interface (GUI) to a client device of a user;
    receiving, a first input, via the GUI, from the user identifying at least one digital wallet provider;
    determining, whether the user already possesses a cross-platform key associated with an account credential of the digital wallet provider;
    based on the determination, generating the cross-platform key, the cross-platform key comprising a set of partial account data as compared to a normal transaction; and
    associating the cross-platform key with the at least one digital wallet provider.

11. The non-transitory computer readable medium of claim 10, wherein the GUI comprises one or more data fields for completing a request for a cross-platform key.

12. The non-transitory computer readable medium of claim 10, wherein the processor executable method further comprises:
    receiving a second input, the second input identifying the account credential associated with the at least one digital wallet provider.

13. The non-transitory computer readable medium of claim 10, wherein the account credential is associated with an account associated with the at least one digital wallet provider.

14. The non-transitory computer readable medium of claim 10, wherein the processor executable method further comprises:
    presenting, by the GUI, additional user input fields, wherein the additional input fields can comprise at least one of: a field for a name of a second digital wallet provider, a field for a name of a party to receive funds, or a field for an amount of funds.

15. The non-transitory computer readable medium of claim 10, wherein the displaying of the GUI further comprises:
presenting at least one of an option to confirm completing a transaction to a displayed account number, or an option to scan a code to submit a payment to another party.

16. The non-transitory computer readable medium of claim 10, wherein the cross-platform key comprises a virtual account number.

17. The non-transitory computer readable medium of claim 10, wherein the processor executable method further comprises:
associating the cross-platform key with a virtual account number.

18. The non-transitory computer readable medium of claim 10, wherein the processor executable method further comprises:
sending a request, via the client device, to a second party to conduct a cross-platform transaction with a second wallet provider associated to the second party.

19. A client device comprising:
a wireless communication interface;
at least one memory to store instructions;
at least one processor coupled to the at least one memory, wherein the at least one processor is configured to execute the instructions to:
display, a graphical user interface (GUI), the GUI comprising at least one data field for requesting a cross-platform key;
receive a first input from a user, via the at least one data field, wherein the first input identifies at least one digital wallet provider;
receive a second input from the user, via the at least one data field,
wherein the second input identifies an account credential associated with the at least one digital wallet provider;
determine whether the user already possesses a cross-platform key associated with the account credential;
based on the determination being negative, generating the cross-platform key, the cross-platform key comprising a set of partial account data; and
associate the cross-platform key with the at least one digital wallet provider.

20. The client device of claim 19, wherein the processor executes further instructions to:
communicate, via the wireless communication interface, at least one of an account, a username, other credentials, or a request to conduct a cross-platform transaction to a payment gateway server.

* * * * *